United States Patent [19]

Gruner

[11] 4,006,995
[45] Feb. 8, 1977

[54] DRILL FOR USE IN A BORING MACHINE

[76] Inventor: Hans Gruner, Hausen (Fils), Germany

[22] Filed: Mar. 10, 1975

[21] Appl. No.: 556,883

[30] Foreign Application Priority Data

Mar. 9, 1974   Germany .......................... 2411394

[52] U.S. Cl. ................................ 408/157; 408/181; 408/183; 408/185; 408/197
[51] Int. Cl.² ........................................ B23B 51/00
[58] Field of Search .......... 408/146, 147, 153, 157, 408/181, 182, 183, 197, 185; 279/46

[56] References Cited

UNITED STATES PATENTS

| 871,031 | 11/1907 | Chase, Jr. | 408/183 |
| 1,994,791 | 3/1935 | Sanderson | 279/46 |
| 2,367,560 | 1/1945 | Boland | 408/181 X |
| 3,187,408 | 6/1965 | Titterud | 408/197 X |
| 3,767,317 | 10/1973 | Ortlieb | 408/183 |

FOREIGN PATENTS OR APPLICATIONS

| 1,278,739 | 11/1960 | France | 408/183 |
| 120,035 | 10/1947 | Sweden | 408/183 |
| 176,095 | 3/1935 | Switzerland | 408/183 |
| 541,162 | 11/1941 | United Kingdom | 408/185 |
| 4,611 | 3/1895 | United Kingdom | 408/185 |
| 190,309 | 12/1922 | United Kingdom | 408/157 |

*Primary Examiner*—Leonidas Vlachos
*Assistant Examiner*—W. R. Briggs
*Attorney, Agent, or Firm*—Watson, Cole, Grindle & Watson

[57] ABSTRACT

A drill for use in boring machines has a tool holder with two cutter bars having cutters projecting radially therefrom. The cutter bars are movably mounted in a radial direction in a recess passing through the tool holder. The tool holder includes a base part and walls projecting therefrom forming the recess therebetween. The cutter bars are arranged in this recess in end-to-end relation and are of a width substantially equal to the width of the recess. The base is provided with two slots therein communicating with the recess, the slots being offset with respect to each other and each extending from the outside of the base in a direction substantially parallel to the length of the recess up approximately to the central axis. Bolts engaged in the parts on opposite sides of the slots can be tightened to deform the walls of the recess so as to clamp the cutter bars therebetween.

8 Claims, 6 Drawing Figures

DRILL FOR USE IN A BORING MACHINE

BACKGROUND OF THE INVENTION

This invention relates to a drill for use in a boring machine and having a tool holder with two cutter bars, each having a cutter projecting radially from the periphery of the tool holder, the cutter bars being movably mounted in a radial direction in a recess passing through the tool holder, the cutter bars being fixable in their respective positions. Thus such drills serve for boring of drilled holes, the radial spacing between the cutters and the longitudinal axis of the tool holder being alterable, in order to adapt the drill to holes of various diameters, or in order to vary the thickness of chip material removed during processing. Because during processing of drilled holes considerable forces have to be applied by the cutters, correspondingly large torques must be transmitted by the drill and if the range of usefulness of the drill in relation to the forces to be applied during cutting is not to be limited, the construction of the drill should be extremely robust.

SUMMARY OF THE INVENTION

The purpose of the present invention is to provide a drill of the type mentioned, which can transmit large torques preferably without the occurrence of rattling or resonant vibrations in component parts thereof and which also minimizes the risk of a difference occurring between the spacing between both cutters when set in the loose state, and the actual value existing after tightening.

According to the present invention there is provided a drill for use in a boring machine, said drill comprising a tool holder having a diametrically-disposed recess at the opposite ends of which a pair of cutter bars are located, the cutter bars being substantially equal in width to the width of the recess and having cutters arranged for radial projection from the periphery of the tool holder and wherein the recess extends in the axial direction of the tool holder into slots extending in the same diametrical direction as the recess and located at the cutter bars which are clamped in position by elements effecting localised elastic deformation of the walls of the recess adjacent said slots.

BRIEF DESCRIPTION OF THE DRAWINGS

Embodiments of the present invention will now be described by way of example with reference to the accompanying drawings, in which.

DESCRIPTION OF THE PREFERRED EMBODIMENTS

Figure 1:
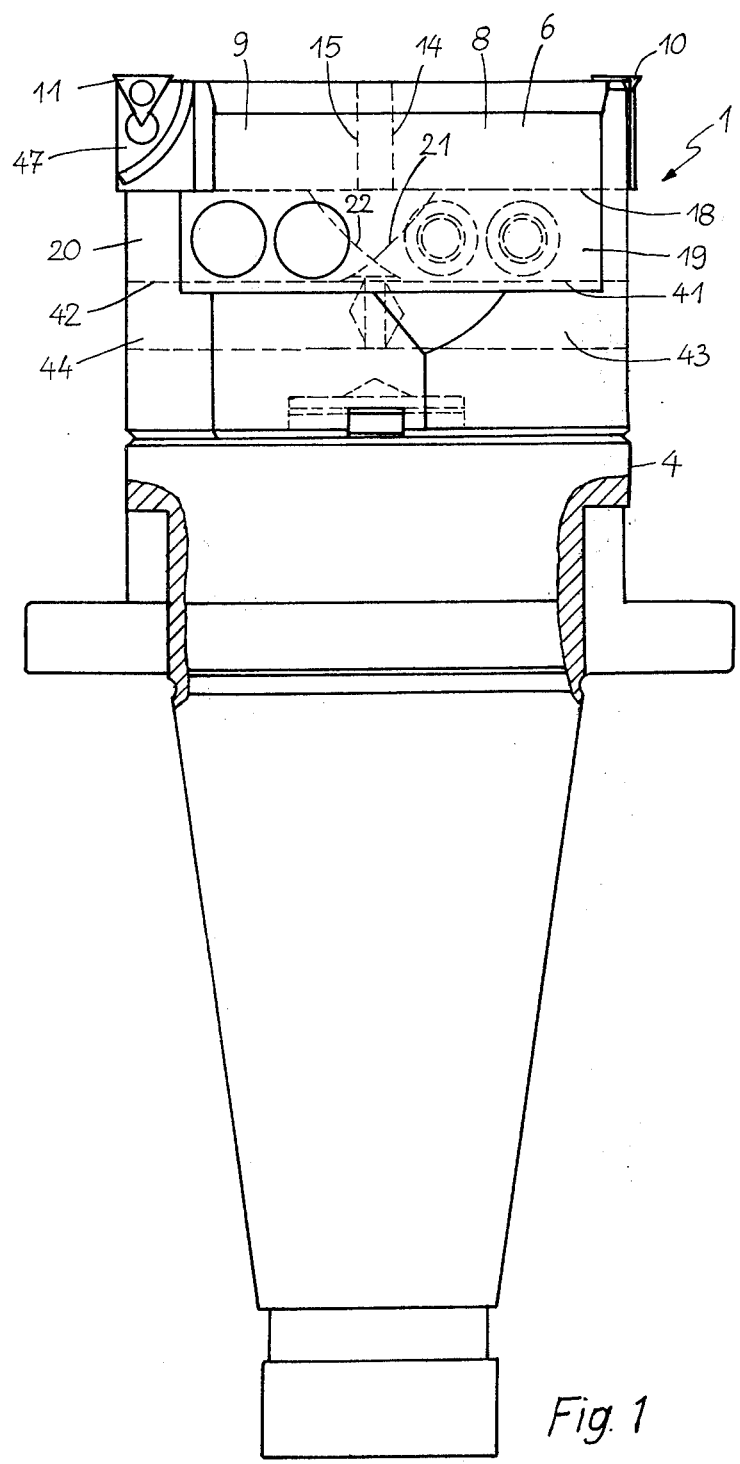
FIG. 1 is a view of a first embodiment of the drill according to the present invention and taken in the direction of the arrow I in FIG. 4.

In the embodiment according to FIGS. 1 to 4, a tool holder 1 is connected by bolts 2, 3 on to a drill carrier 4, the connection including a centre pin and entrainment block to centre the holder and fix it in a non-rotatable manner to the drill carrier. The holder 1 is penetrated diametrically by a recess 5, which is laterally bounded by projections 6, 7 extending from the body of the holder 1. In the recess 5 there are two cutter bars 8, 9 respectively carrying a releasable cutter 10, 11 projecting radially from the periphery of the holder 1. The inner surfaces 12, 13 of the projections 6, 7 which define the width of the recess are spaced apart by a distance substantially equal to the width h of the cutter bars and both bars 8, 9 are arranged end to end in the recess 5, thus having their inner end-surfaces 14, 15 facing one another. In order to make both bars 8, 9 axially immovable, both inner surfaces 12, 13 of the projections 6, 7 and all the outer surfaces of the cutter bars 8, 9 which are associated with an inner surface, have a radially-orientated pointed toothing or serration 16, 17 as is apparent from FIG. 3. On the base 18 of the recess 5, which connects the two inner surfaces 12, 13 there are two slots 19, 20 associated respectively with the location of the cutter bars 8, 9 and then slots 19, 20 extend in the same diametrical direction as the recess 5, but are offset to one another with respect to the medial plane of the recess 5, by the distance a. Both slots 19, 20 extend in their longitudinal direction from the periphery of the tool holder 1 as far as the curves 21 or 22 shown in dotted lines in FIG. 1, i.e., roughly over a length corresponding to that of the respectively associated cutter bar 8 or 9, and roughly as far as the centre of the recess 5 which coincides with the longitudinal axis of the tool holder. The slots 19, 20 are mutually offset in such a way that the slot 19 is located closely adjacent the longitudinal edge 23, and the slot 20 is closely adjacent the longitudinal edge 24 of the recess 5. Thus, each of the two slots is defined on one side by a body portion of the tool holder which has a smaller radial dimension than the body portion defining it on the other side, as is apparent from FIG. 2. Because each of the two slots 19, 20 extends only roughly as far as the centre of the recess 5, and as a result of the mutual offsetting of the slots, the projections 6, 7 are respectively longitudinally divided into two regions 25, 26 and 27, 28 one region, 25 or 28, being elastically deformable, and the other region 26 or 27, being rigid. Regions 25, 28 of the projections 6, 7 are elastically deformed by means of clamp elements in the form of bolts 29, 30 or 31, 32, each of which penetrates the tool holder at right angles to its associated slot, for example through an aperture 33 which opens at the periphery of the tool holder and against which the bolt head engages. By tightening the bolts 29, 30 the cutter bar 8 is clamped between the elastically-deformable region 25 of the projection 6, and the rigid region 27 of the projection 7, whereas the cutter bar 9 is clamped between the regions 28, 26 of the projections 7, 6 respectively, by tightening the bolts 31, 32. Because of this it is possible, for example, when the cutter bar 8 is clamped, to shift the bar 9 in a radial direction by loosening the bolts 31, 32 while both cutter bars 8, 9 may of course be shifted simultaneously by loosening all of the bolts 29, 30, 31, 32. In order exactly to set the spacing between both cutters 10, 11 in a simple manner and to a determined value, the surfaces 14, 15 of the cutter bars 8, 9 are interconnected by a double-threaded bolt 35, there being located between the bolt halves 36 or 37 which respectively threadedly engage in the bars 8, 9, an actuating collar 38, which can be found by insertion of a thrust pin (not shown) in a radial opening 40. The collar 38 may alternatively be in the form of a hexagon. The bolt half 36 has a left-hand thread, whereas the bolt half 37 has a right-hand thread, so that, when all the screws 29, 30, 31, 32 are loosened, rotation of the operating collar 38 in one direction moves the cutter bars 8, 9 towards one another, and when the collar 38 is rotated in the other direction, the cutter bars move apart. If, on the other hand, only one of the two cutter bars is not clamped, and the other is clamped, rotation of the collar 38 moves only the unclamped cutter bar. The adjusting mechanism is thus very simply constructed, and its incorporation requires no further removal of material from the body of the tool holder, which would entail weakening the tool holder itself.

Figure 2:
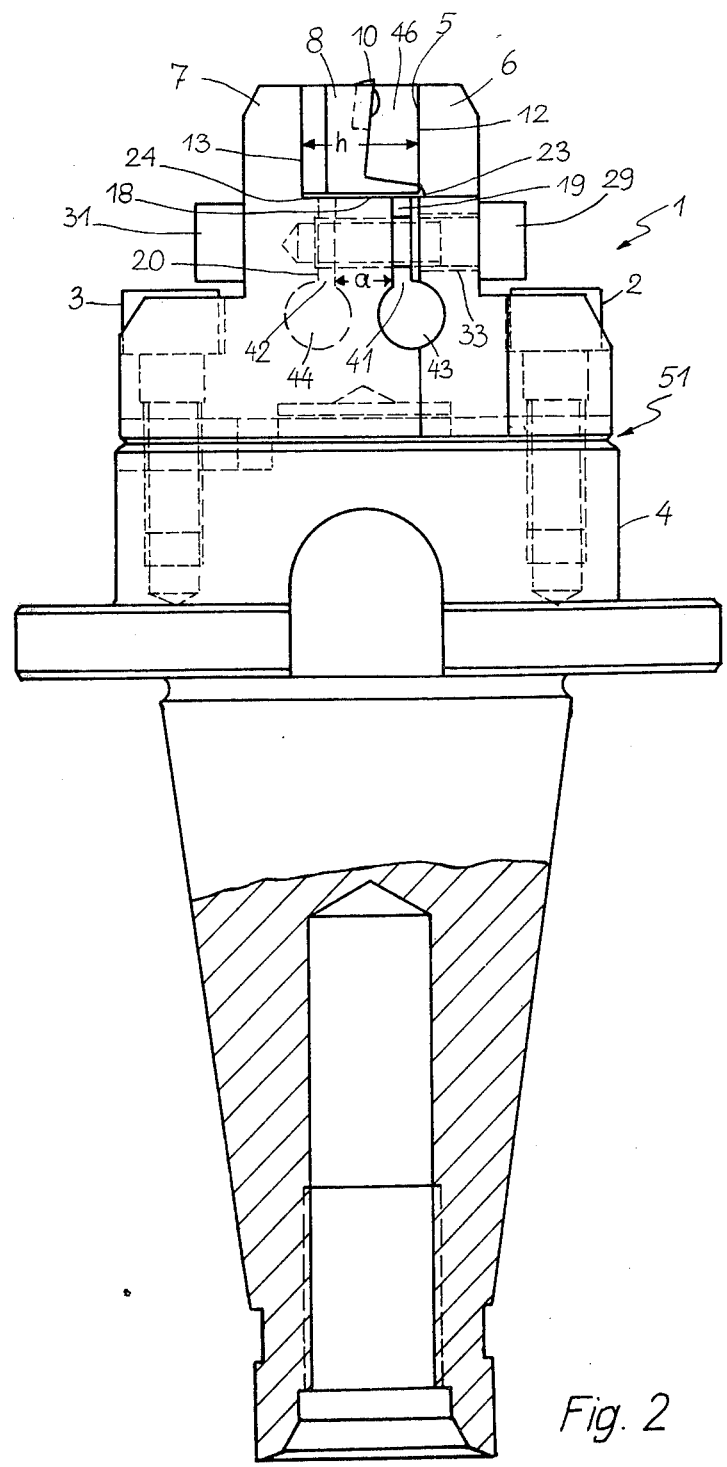
FIG. 2 is a view of the same drill taken in the direction of the arrow II in FIG. 4.
Figure 3:
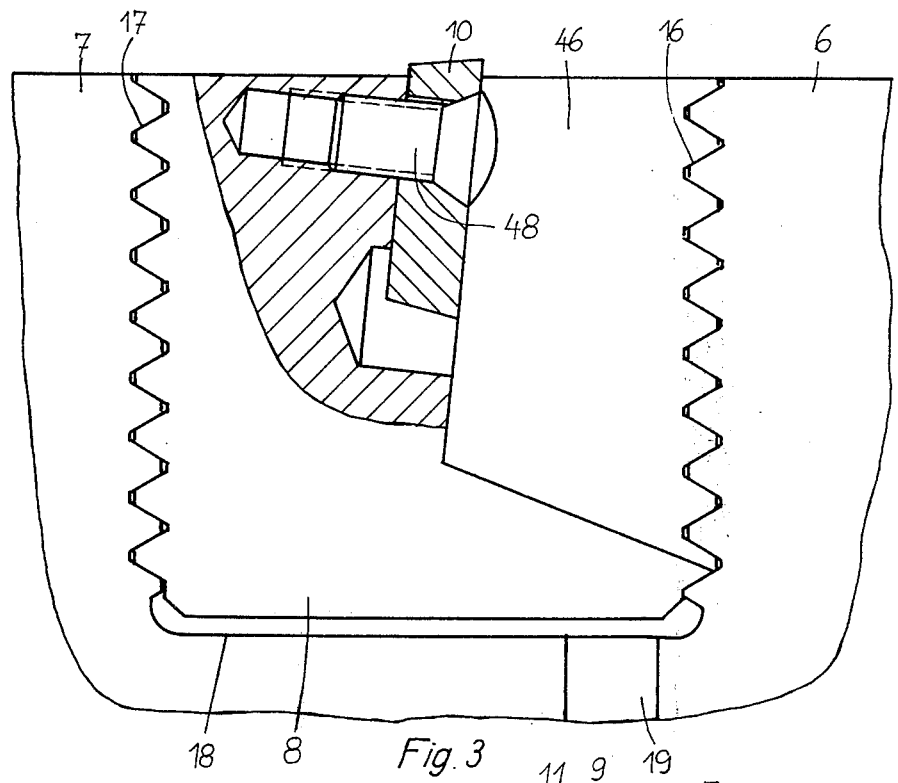
FIG. 3 is an enlarged view of a detail from FIG. 2.
Figure 4:
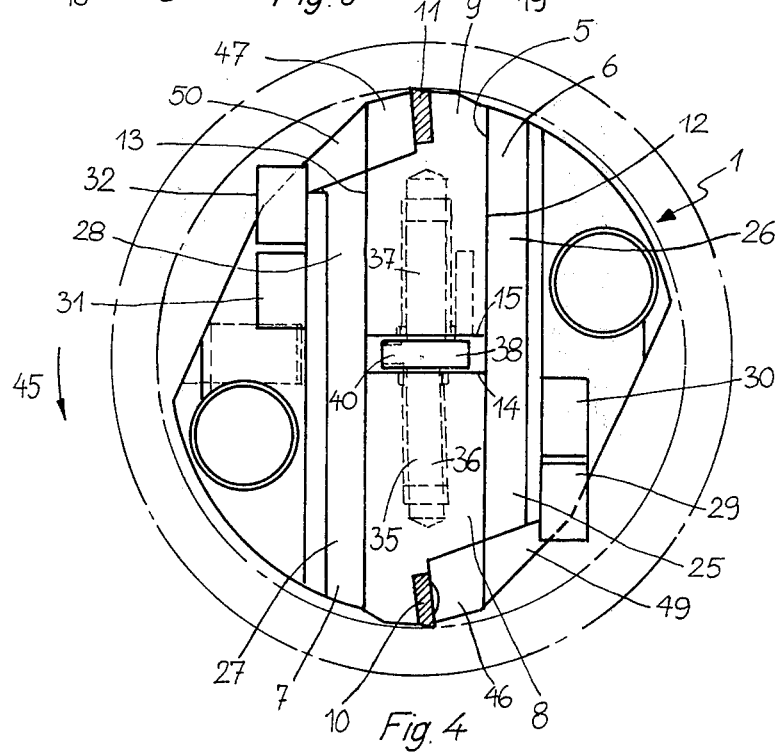
FIG. 4 is an end view of the drill forming the first embodiment.

As is apparent from FIGS. 1 and 2, each slot 19 or 20 opens at its base 41 or 42 into a transverse circular aperture 43 or 44, extending parallel to the base 18 of the recess 5, thus avoiding formation of cracks through frequent elastic deformation. In advance of the cutters 10 or 11, with respect to the rotational direction 45 of the drill, each cutter bar 8 or 9 has a recess 46 or 47, serving as a waste-chamber for accommodating the chips resulting from processing of a drilled hole. As is particularly apparent from FIG. 3, the cutter 10 is secured in the cutter bar 8 by a bolt 48, which is screwed in from the recess 46 which extends radially inwards. Each of the recesses 46, 47 can have a corresponding recess 49, 50 on the body of the tool holder.

Figure 5:
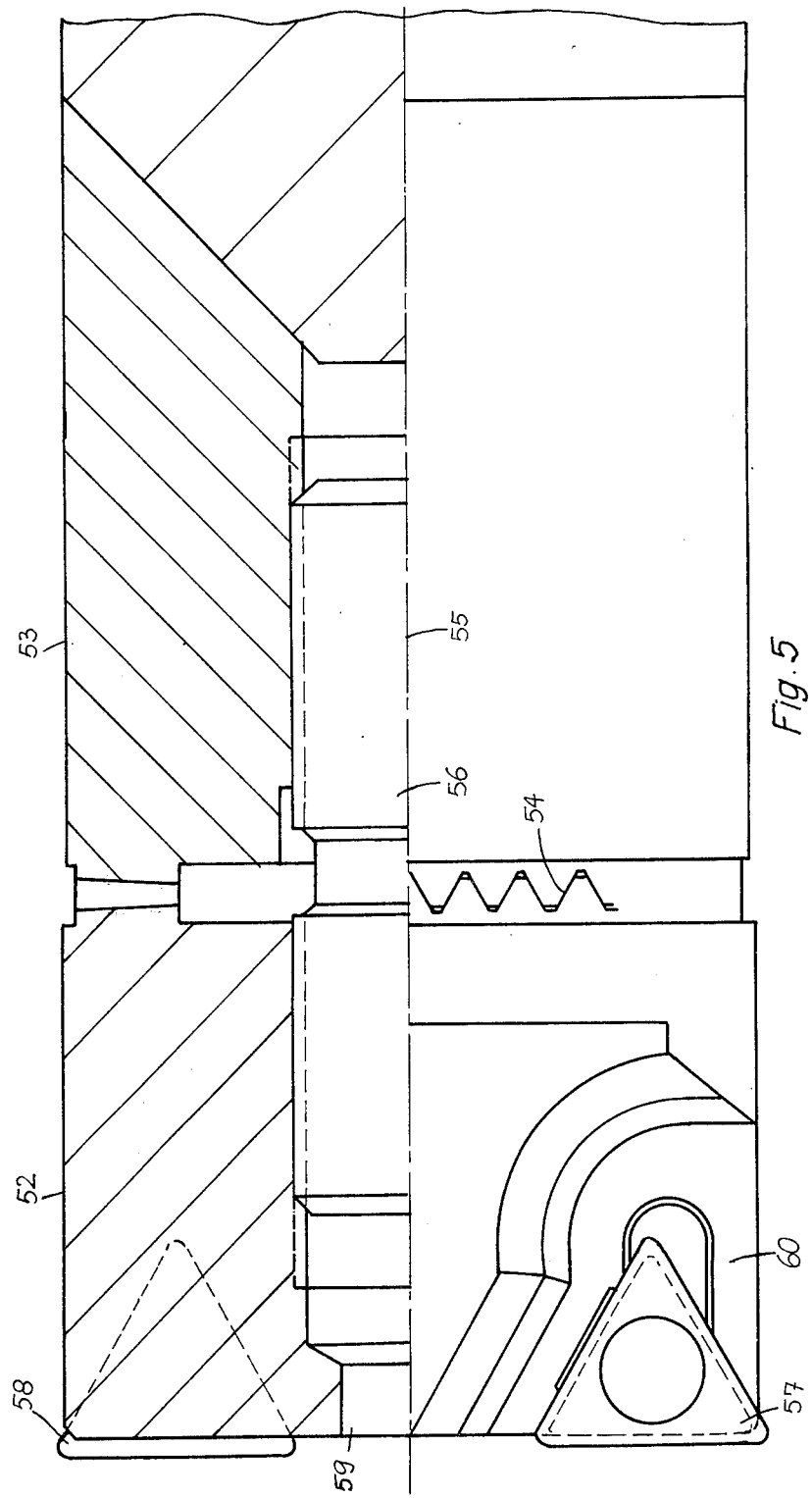
FIG. 5 is a view in partial section of a second embodiment.
Figure 6:
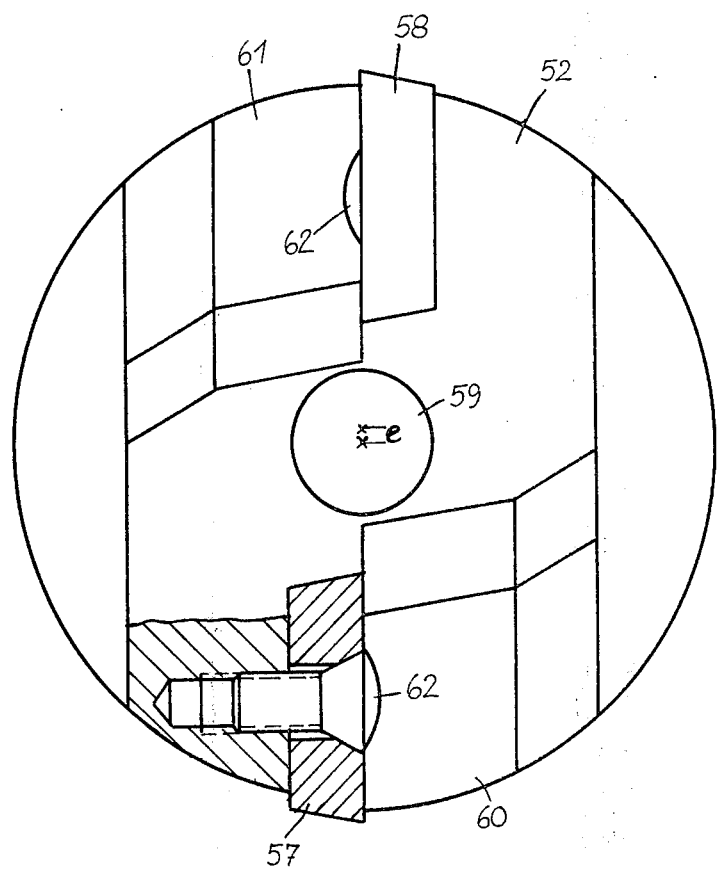
FIG. 6 is an end view of the embodiment according to FIG. 5.

Whereas, in the embodiment according to FIGS. 1 to 4, the connection between the tool holder 1 and the drill carrier 4 is effected by means of the flange connection 51, in the embodiment according to FIGS. 5 and 6 the tool holder 52 and the drill carrier 53 are connected together by a circumferentially-extending toothing or serration 54 (which is a so-called Hirth or serration toothing) the centre of the toothing 54 being offset relative to the longitudinal axis 55 of the drill carrier 53 by a distance e (FIG. 6). In addition, the tool holder 52 is releasably clamped to the drill carrier 53 by a differential threaded bolt 56, so that, by rotation of the bolt 56, the toothing 54 can be released, whereupon rotation of the body of the tool holder 52 enables alteration of the distance between the cutter bars and the longitudinal axis 55. With this arrangement therefore adjustment of the radial spacing between cutters 57, 58 and the longitudinal axis 55 is possible without moving the cutters 57, 58 relative to the tool holder 52. Therefore, in the embodiment illustrated in FIGS. 5 and 6 the body of the tool holder and the two cutter bars present in the embodiment according to FIGS. 1 to 4 can alternatively form part of an integral component, these parts thus representing a non-part unit, so that this embodiment is extremely simple in structure, and therefore is inexpensive to manufacture, and in addition, as a result of the simplicity of structure, the tool holder designed in this way can be produced with such a small diameter that even the smallest holes can be processed. It should also be mentioned that the differential-thread bolt 56 can be activated through the aperture 59, and that, in the regions of the cutters 57 or 58, recesses 60 or 61 are provided in the tool holder 52 as chip chambers and permit access to the screws 62 or 63 securing the cutters 57 or 58.

In accordance with the present invention it is possible to provide a drill having a tool holder wherein the height of the recess is minimised because clamping of the movable cutter bars occurs between a flexible and a rigid part of the tool holder and this permits a stable arrangement of drill suitable for transmitting large torques. In addition the ability to adjust one cutter at a time is advantageous when one cutter is being used for coarse work and the other for fine work.

What I claim is:

1. A drill for use in a boring machine comprising a tool holder having a base with spaced walls projecting therefrom having a recess therebetween extending transversely of the axis of the holder, a pair of cutter bars mounted in the recess in end-to-end relation and each having a width substantially equal to the width of the recess and having cutters thereon arranged for radial projection from the periphery of the holder, the base having two noncommunicating slots therein communicating with the recess and extending therefrom in a direction parallel to such axis, and in the same diametrical direction as the recess, and two means located on opposite sides of said central plane each operatively connected with the parts of the base on opposite sides of each of one of said slots to deform said walls to clamp the cutter bars therebetween the slots extending from opposite sides of the tool holder approximately to the central plane thereof.

2. A drill as claimed in claim 1, in which the deforming means comprise bolts extending at right angles to the length of the recess and having heads engaging the surface of the base.

3. In a drill as claimed in claim 1, a screw-threaded member threadedly engaging each cutter bar, said member having an actuating collar located between the two cutter bars and having oppositely-handed threads engaging respective cutter bars.

4. A drill as claimed in claim 1, wherein each slot opens over its entire length into a circular aperture extending parallel to the recess.

5. A drill as claimed in claim 1, wherein the mutually engageable surfaces of the cutter bars and walls of the recess are serrated.

6. A drill as claimed in claim 1, having a chip chamber in front of the cutter taken in the direction of rotation of the drill.

7. A drill as claimed in claim 1, a drill carrier and means connecting the drill holder to the drill carrier comprising a flange connection incorporating a centering pin and means for preventing rotation of the tool holder with respect to the drill carrier.

8. A drill as claimed in claim 1, and means connecting the drill holder to the drill carrier comprising a connection including circumferentially extending serrations on the tool holder and on the carrier, the center of the serrations being located eccentrically with respect to the longitudinal axis of the drill carrier.

* * * * *